United States Patent
Park et al.

(10) Patent No.: US 8,423,054 B2
(45) Date of Patent: Apr. 16, 2013

(54) METHOD AND APPARATUS OF OPERATING IN IDLE MODE IN WIRELESS COMMUNICATION SYSTEM

(75) Inventors: Gi Won Park, Anyang-si (KR); Jeongki Kim, Anyang-si (KR); Ronny Yongho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/529,989

(22) Filed: Jun. 21, 2012

(65) Prior Publication Data

US 2012/0314638 A1    Dec. 13, 2012

Related U.S. Application Data

(63) Continuation of application No. 12/650,428, filed on Dec. 30, 2009, now Pat. No. 8,229,476.

(60) Provisional application No. 61/151,195, filed on Feb. 10, 2009, provisional application No. 61/142,637, filed on Jan. 6, 2009.

(30) Foreign Application Priority Data

Jun. 25, 2009  (KR) .................. 10-2009-0056838

(51) Int. Cl.
*H04W 68/00* (2009.01)

(52) U.S. Cl.
USPC ........................................ 455/458; 455/436

(58) Field of Classification Search .............. 455/436, 455/458, 522; 370/311, 316, 349
See application file for complete search history.

(56) References Cited

U.S. PATENT DOCUMENTS

| | | |
|---|---|---|
| 2003/0016652 A1 | 1/2003 | Ma et al. |
| 2003/0054820 A1 | 3/2003 | Kang et al. |
| 2005/0049013 A1 | 3/2005 | Chang et al. |
| 2006/0154663 A1 | 7/2006 | Son et al. |
| 2008/0051091 A1 | 2/2008 | Phan et al. |
| 2008/0051109 A1 | 2/2008 | Willey |

FOREIGN PATENT DOCUMENTS

| | | |
|---|---|---|
| JP | 9-65435 | 3/1997 |
| JP | 2008-524956 | 7/2008 |
| KR | 10-0341070 | 5/1995 |
| KR | 10-2001-0108309 | 12/2001 |
| KR | 10-2003-0048600 | 6/2003 |
| TW | 518842 | 1/2003 |
| WO | 2008/153343 | 12/2008 |
| WO | 2009/041880 | 4/2009 |

OTHER PUBLICATIONS

Shashikant Maheshwari et al., "Re: SDD: Reply to call for comment IEEE 80216m-08/040 on C80216m-08/003r5", IEEE C802.16m-08/1396, Oct. 2008, 6 pages.
Japan Patent Office Application U.S. Appl. No. 2011-539455, Office Action dated Nov. 5, 2012, 2 pages.
Taiwan Intellectual Property Office Application Serial No. 098146488, Office Action dated Dec. 28, 2012, 6 pages.
Japan Patent Office Application Serial No. 2011-539455, Office Action dated Jan. 25, 2013, 2 pages.

*Primary Examiner* — Sam Bhattacharya
(74) *Attorney, Agent, or Firm* — Lee, Hong, Degerman, Kang & Waimey

(57) ABSTRACT

A method of monitoring a paging message in a wireless communication system, which is performed by a mobile station operating in an idle mode including a paging listening interval and a paging unavailable interval, includes receiving a segment of the paging message comprising a plurality of segments during the paging listening interval, the received segment of the paging message including an extension flag indicating whether a remaining segment of the paging message exists; monitoring at least one subsequent subframe or frame to receive the remaining segment of the paging message while the mobile station remains awake if the extension flag indicates that the remaining segment of the paging message exists; and entering the paging unavailable interval if the mobile station is not paged after receiving all segments of the paging message.

13 Claims, 11 Drawing Sheets

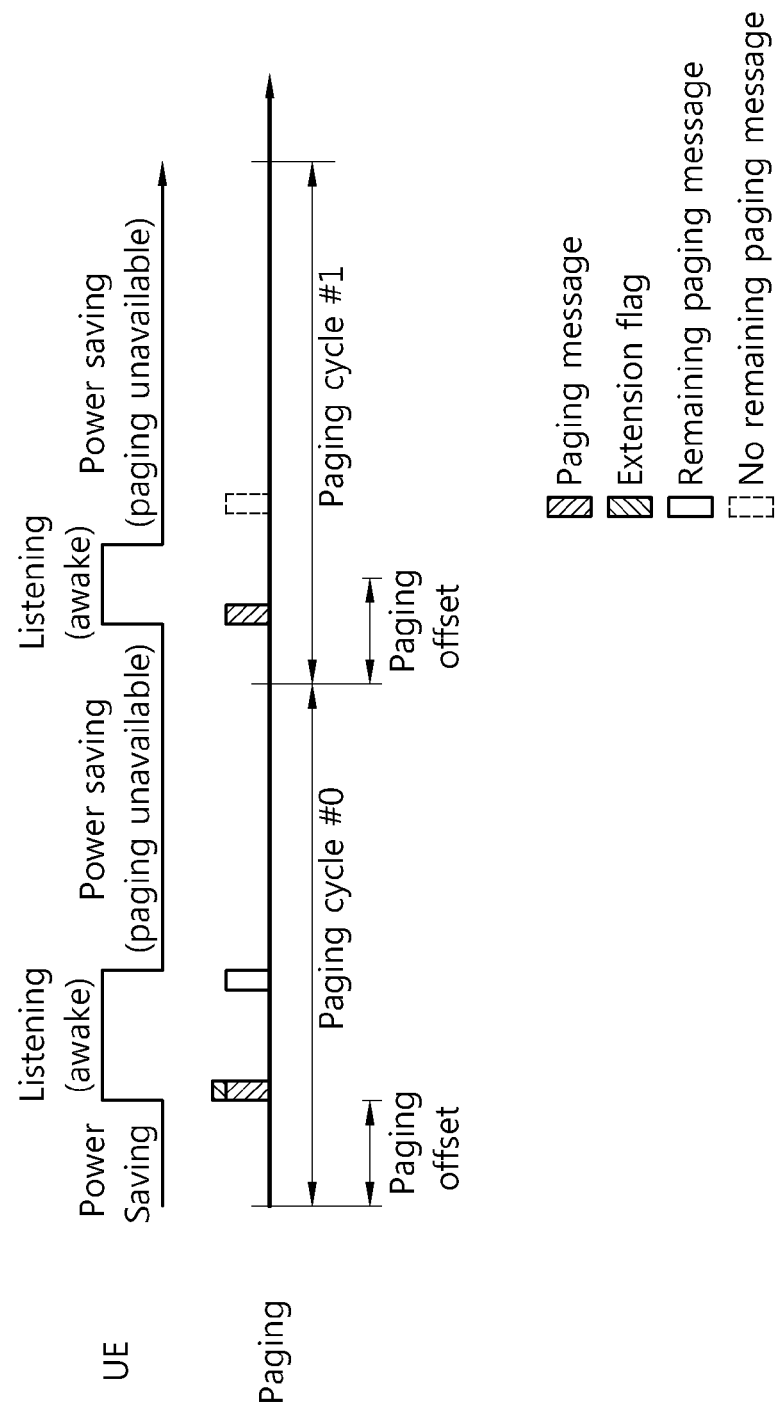

METHOD AND APPARATUS OF OPERATING IN IDLE MODE IN WIRELESS COMMUNICATION SYSTEM

CROSS-REFERENCE TO RELATED APPLICATIONS

This application is a continuation of U.S. patent application Ser. No. 12/650,428, filed on Dec. 30, 2009, now U.S. Pat. No. 8,229,476, which claims the benefit of earlier filing date and right of priority to Korean Patent Application No. 10-2009-0056838, filed on Jun. 25, 2009, and also claims the benefit of U.S. Provisional Application Ser. Nos. 61/151,195, filed on Feb. 10, 2009, and 61/142,637, filed on Jan. 6, 2009, the contents of which are all incorporated by reference herein in their entirety.

BACKGROUND OF THE INVENTION

1. Field of the Invention

The present invention relates to wireless communications, and more particularly, to a method and apparatus of operating in an idle mode in a wireless communication system.

2. Related Art

With the development of communication and the spread of multimedia technology, a wireless communication system uses various techniques for massive data transmission. A method of assigning a more number of frequency resources may be used as a method of increasing radio capacity. However, since the number of frequency resources is limited, there is a limitation when the more number of frequency resources are assigned to a plurality of users. As one of methods for effectively utilizing the limited frequency resources, there is a method of utilizing a small-sized cell. With the small-sized cell, a base station (BS) provides a service to a less number of users, and thus the BS can assign a more number of frequency resources to the users. Further, a service for massive data transmission with better quality can be provided to the plurality of users.

When a user equipment (UE) does not transmit or receive data for a specific period of time, the UE transitions to an idle mode for power saving. The UE in the idle mode may periodically wake up from a state of not receiving a transmit (Tx) signal of the BS in order to receive a paging message or a broadcast message, and determine whether to transition to an active mode. The UE in the idle mode announces a location of the UE to a core network of a wireless communication system by performing a location update process. The location update process of the UE may be classified into: (1) timer based location update; (2) paging group based location update; and (3) power down based location update, etc. The timer based location update is a method in which location update is performed when a location update timer of the UE expires. The paging group based location update is a method in which location update is performed when the UE moves to an area of another paging group other than a paging group of the UE. The power down based location update is a method in which location update is performed before power is turned off by the UE. The core network can recognize a correct location of the UE according to the location update of the UE, and can transmit the paging message for the UE.

The UE monitors the paging message according to a paging cycle and a paging offset. The paging offset is a period in which the paging message is transmitted. The paging offset is a time at which the paging message is transmitted in one paging cycle. If there is no paging message transmitted to the UE in a current paging cycle, the UE continuously monitors whether the paging message of the UE is transmitted in a next paging cycle.

The paging message is transmitted over a resource region pre-defined according to the paging offset. However, an essential message to be transmitted on a real-time basis such as a voice over Internet protocol (VoIP) message may be transmitted over a resource region pre-defined for the paging message. In this case, the UE cannot receive the paging message of the UE in the current paging cycle and thus has to receive the paging message in the next paging cycle. As a result, transmission delay may occur when the paging message is transmitted to the UE.

Accordingly, there is a need for avoiding the transmission delay of the paging message and for flexibly transmitting the paging message.

SUMMARY OF THE INVENTION

The present invention provides a method and apparatus of operating in an idle mode to receive a paging message.

The present invention also provides a method and apparatus of effectively transmitting a paging message.

In an aspect, a method of operating in an idle mode to receive a paging message in a wireless communication system is provided. The method is performed by a user equipment. The method includes waking during a paging listening interval, receiving a first part of the paging message during the paging listening interval from a base station, wherein the paging message comprises an extension flag indicating extension of the paging listening interval, and receiving a second part of the paging message during the extended paging listening interval.

Upon receiving the first part of the paging message comprising the extension flag, the user equipment may remain awake to monitor the subsequent frames for the second part of the paging message during the extended paging listening interval.

The second part of the paging message may be received in an earliest frame subsequent to a paging frame in which the paging message is received.

The second part of the paging message may be received in one subframe in the earliest frame.

The method may further include after receiving a complete paging message by combining the first and second part of the paging message, returning to a paging unavailable interval during which the base station does not transmit any paging message if the complete paging message confirms that there is no paging message to be delivered to the user equipment.

Upon receiving the first part of the paging message comprising the extension flag, the user equipment may remain awake to monitor the subsequent resource regions for the second part of the paging message during the extended paging listening interval.

The resource regions may be defined by a unit of supeframe or subframe.

In another aspect, a user equipment for operating in an idle mode to receive a paging message in a wireless communication system is provided. The user equipment may include a memory, and a processor operatively coupled with the memory and configured to wake during a paging listening interval, receive a first part of the paging message during the paging listening interval from a base station, wherein the paging message comprises an extension flag indicating extension of the paging listening interval, and receive a second part of the paging message during the extended paging listening interval.

In still another aspect, a method of transmitting a paging message in a wireless communication system is provided. The method include transmitting a first part of a paging message in a first resource region pre-defined for the transmission of the paging message, and transmitting a second part of the paging message in a second resource region, wherein the first part of the paging message comprises a extension flag indicating the transmission of the second part of the paging message.

The resource region may be one of a superframe, a frame and a subframe. The second resource region may be an earliest frame subsequent to the first resource region.

In still another aspect, a base station for transmitting a paging message in a wireless communication system is provided. The base station is configured to transmit a first part of a paging message in a first resource region pre-defined for the transmission of the paging message, and transmit a second part of the paging message in a second resource region, wherein the first part of the paging message comprises a extension flag indicating the transmission of the second part of the paging message.

Transmission delay of a paging message can be decreased, and the paging message can be effectively transmitted.

BRIEF DESCRIPTION OF THE DRAWINGS

FIG. 11 shows an operation of a user equipment in transmission of a paging message according to an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. IEEE 802.16m is an evolution of IEEE 802.16e.

Figure 1:
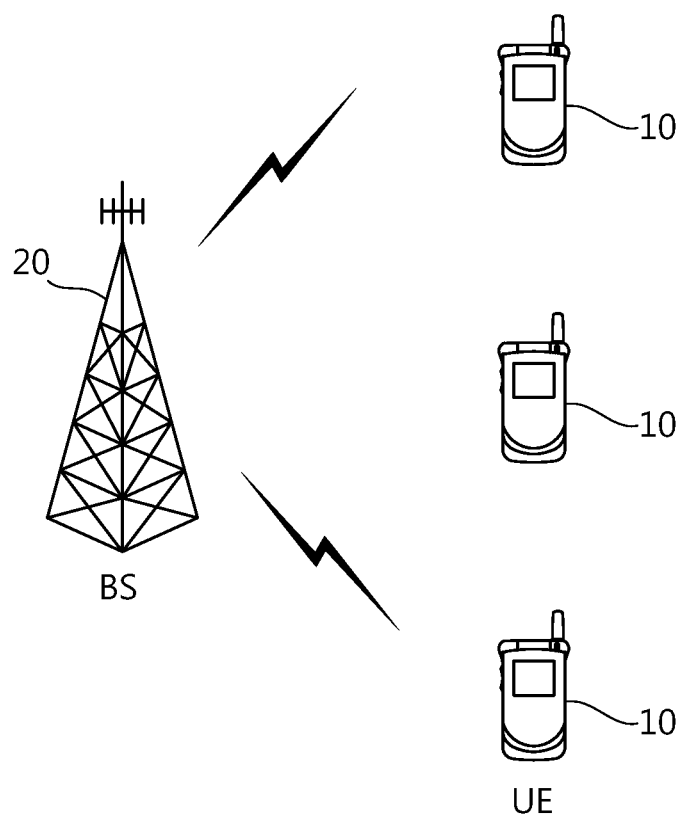
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
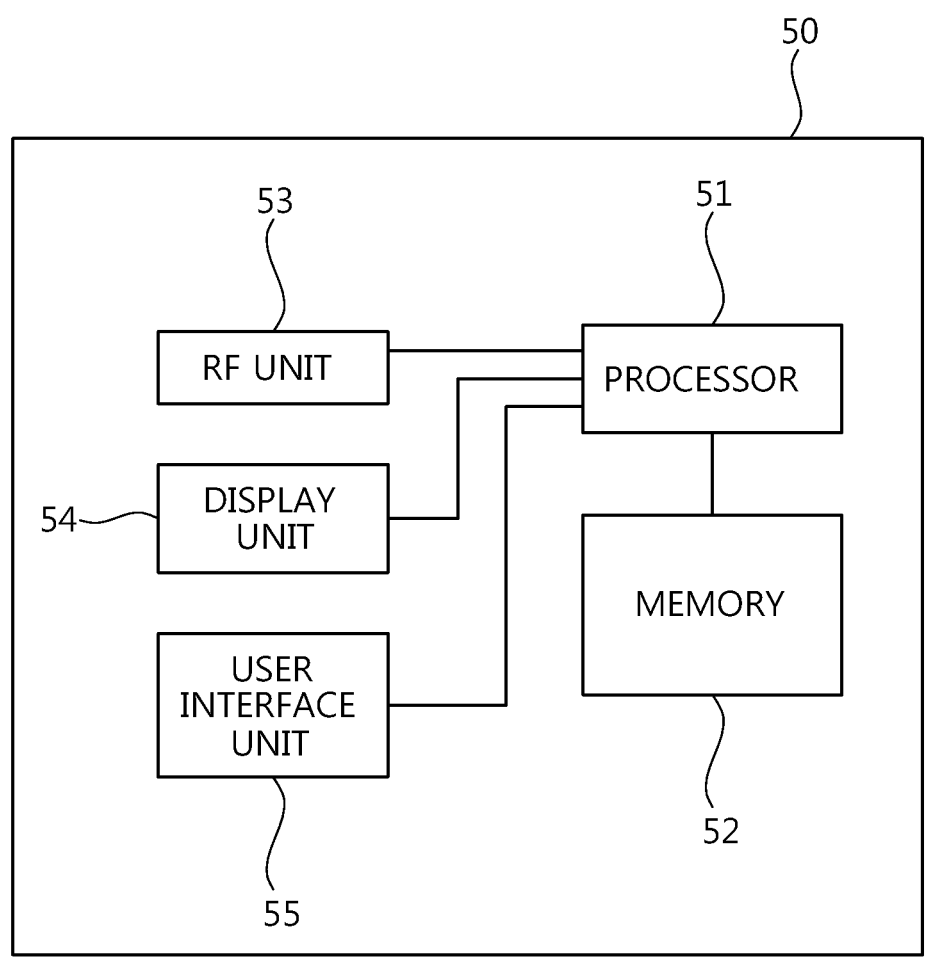
FIG. 2 is a block diagram showing constitutional elements of a user equipment.

FIG. 2 is a block diagram showing constitutional elements of a UE.

Referring to FIG. 2, a UE 50 includes a processor 51, a memory 52, a radio frequency (RF) unit 53, a display unit 54, and a user interface unit 55. Layers of a radio interface protocol are implemented in the processor 51. The processor 51 provides a control plane and a user plane. The function of each layer can be implemented in the processor 51. The processor 51 processes transmitted and received user data and/or control signals.

The memory 52 is coupled to the processor 51 and stores an operating system of the UE, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer belongs to the first layer and provides an information transfer service through a physical channel. A radio resource control (RRC) layer belongs to the third layer and serves to control radio resources between the UE and the network. The UE and the network exchange RRC messages via the RRC layer.

Figure 3:
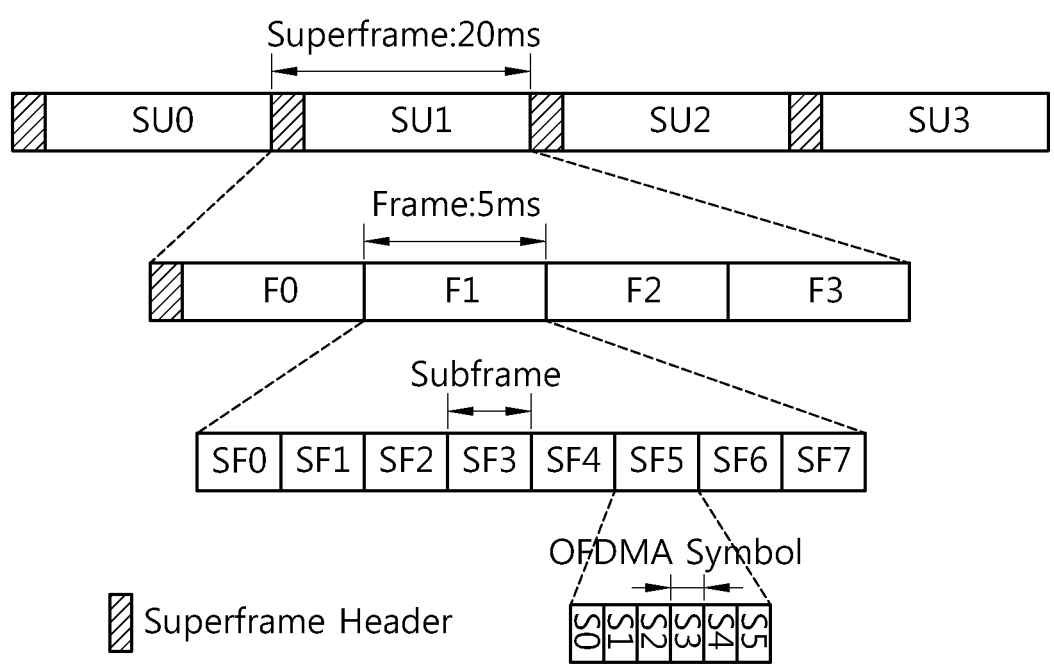
FIG. 3 shows an example of a frame structure.

FIG. 3 shows an example of a frame structure.

Referring to FIG. 3, a superframe (SU) includes a superframe header (SFH) and four radio frames F0, F1, F2, and F3. Although it is shown that each superframe has a size of 20 milliseconds (ms) and each frame has a size of 5 ms, the present invention is not limited thereto. The SFH may be located at a front-most position of the superframe. A common control channel is assigned to the SFH. The common control channel is used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 orthogonal frequency division multiple access (OFDMA) symbols in time domain, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. Thus, UL transmission and UL transmission can be performed at a different time while occupying the same frequency band. In the FDD, each subframe is used in UL or DL transmission at the same time and at a different frequency. That is, subframes included in an FDD frame are divided into a UL subframe and a DL subframe in a frequency domain. Thus, UL transmission and DL transmission can be simultaneously performed while occupying different frequency bands.

A subframe includes at least one frequency partition. The frequency partition consists of at least one physical resource unit (PRU). The frequency partition may include a contiguous/localized PRU and/or a distributed/non-contiguous PRU. The frequency partition may be used for other purposes such as fractional frequency reuse (FFR) or multicast or broadcast service (MBS).

The PRU is defined as a basic physical unit for assigning resources including a plurality of consecutive OFDMA symbols and a plurality of consecutive subcarriers. The number of OFDMA symbols included in the PRU may be equal to the number of OFDMA symbols included in one subframe. For example, when one subframe consists of six OFDMA symbols, the PRU may be defined with 18 subcarriers and six OFDMA symbols. A logical resource unit (LRU) is a basic logical unit for distributed resource assignment and localized resource assignment. The LRU is defined with a plurality of OFDMA symbols and a plurality of subcarriers, and includes pilots used in the PRU. Therefore, one LRU includes a number of data subcarriers, where the number of data subcarriers depends on the number of assigned pilots.

A distributed resource unit (DRU) may be used to obtain a frequency diversity gain. The DRU includes a distributed subcarrier group in one frequency partition. The DRU has the same size as the PRU. In the DRU, one or more subcarriers may be a minimum unit of physically consecutive subcarriers constituting each of the distributed subcarrier groups.

A contiguous resource unit (CRU) may be used to obtain a frequency selective scheduling gain. The CRU includes a localized subcarrier group. The CRU has the same size as the PRU. The CRU and the DRU may be supported in the frequency domain by using a frequency division multiplexing (FDM) scheme.

Figure 4:
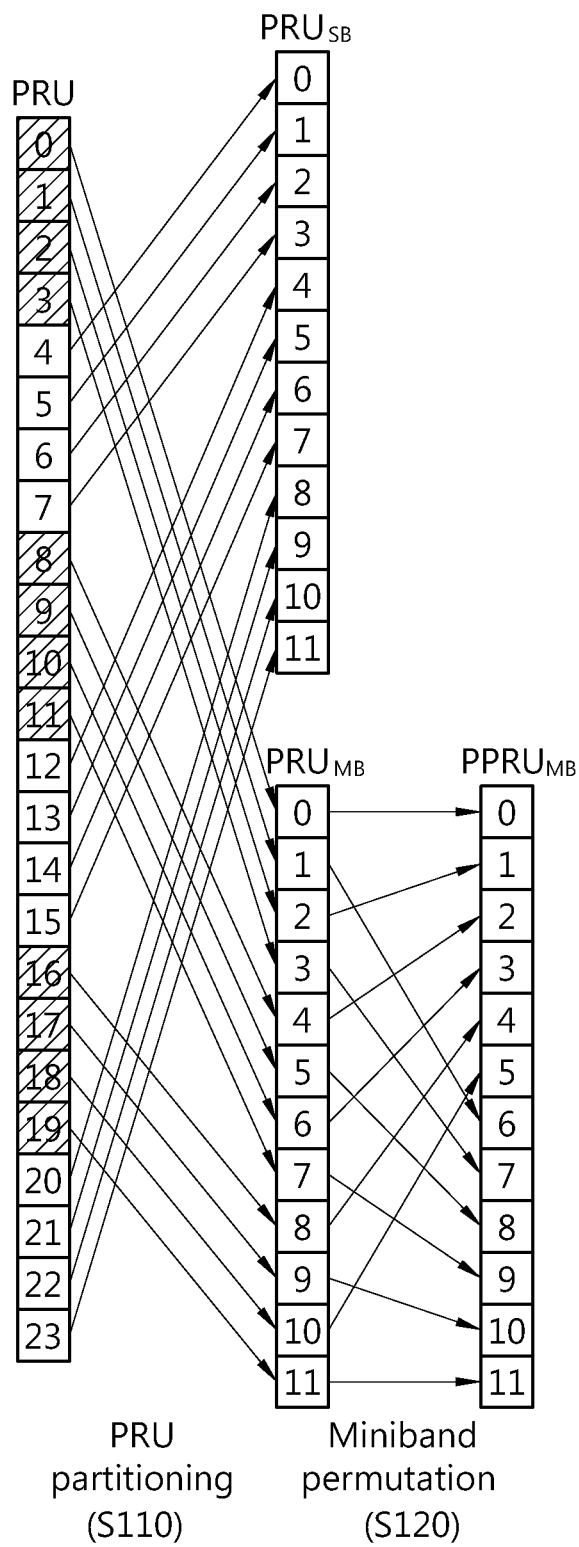
FIG. 4 shows exemplary mapping of a physical resource unit.

FIG. 4 shows exemplary mapping of a physical resource unit.

Referring to FIG. 4, all subcarriers used in a system bandwidth constitute PRUs. One PRU may include 18 subcarriers in a frequency domain and may consist of 6 OFDMA symbols or 7 OFDMA symbols in a time domain. The number of OFDMA symbols included in the PRU depends on a subframe type. The subframe type is classified into a subframe type 1 including 6 OFDMA symbols and a subframe type 2 including 7 OFDMA symbols. However, the present invention is not limited thereto, and thus the subframe type may be defined as another subframe type including various OFDMA symbols, e.g., 5 OFDMA symbols, 9 OFDMA symbols, etc.

PRUs are divided into a subband and a miniband according to a pre-defined PRU partitioning rule (step S110). The subband denotes a unit of contiguous PRUs in the frequency domain or a minimum unit for constituting a CRU. A size of the subband in the frequency domain may be 4 PRUs. The miniband denotes a unit of a distributed PRU or a unit for constituting a DRU. A size of the miniband in the frequency domain may be 1 PRU or a multiple integer of the PRU. All PRUs can be assigned as the subband or the miniband by being selected in a 4-PRU unit corresponding to the size of the subband. PRUs belonging to the subband are referred to as $PRU_{SB}$, and PRUs belonging to the miniband are referred to as $PRU_{MB}$. The number of all PRUs is equal to the sum of the number of $PRU_{SB}$ and the number of $PRU_{MB}$. The $PRU_{SB}$ of the subband and the $PRU_{MB}$ of the miniband are reordered. The $PRU_{SB}$ of the subband is numbered from 0 to (the number of $PRU_{SB}-1$). The $PRU_{MB}$ of the miniband is numbered from 0 to (the number of $PRU_{MB}-1$).

The $PRU_{MB}$ of the miniband is subjected to miniband permutation so that the $PRU_{MB}$ is permutated in the frequency domain to ensure frequency diversity in each frequency partition (step S120). That is, the numbered $PRU_{MB}$ is permutated to generate a permuted-$PRU_{MB}$ ($PPRU_{MB}$) according to a pre-defined permutation rule (or mapping rule).

Thereafter, the $PRU_{SB}$ and the $PRU_{MB}$ are assigned to one or more frequency partitions. Each frequency partition is subjected to a cell-specific resource mapping process such as CRU/DRU assignment, sector-specific permutation, subcarrier permutation, etc.

Now, a technique for avoiding transmission delay of a paging message and for flexibly transmitting the paging message will be described. Although a process of transitioning a mode of a UE to an idle mode to reduce power consumption and a process of transmitting the paging message for the UE in the idle mode will be described, the proposed process of transmitting the paging message is not limited to a specific mode of the UE.

Figure 5:
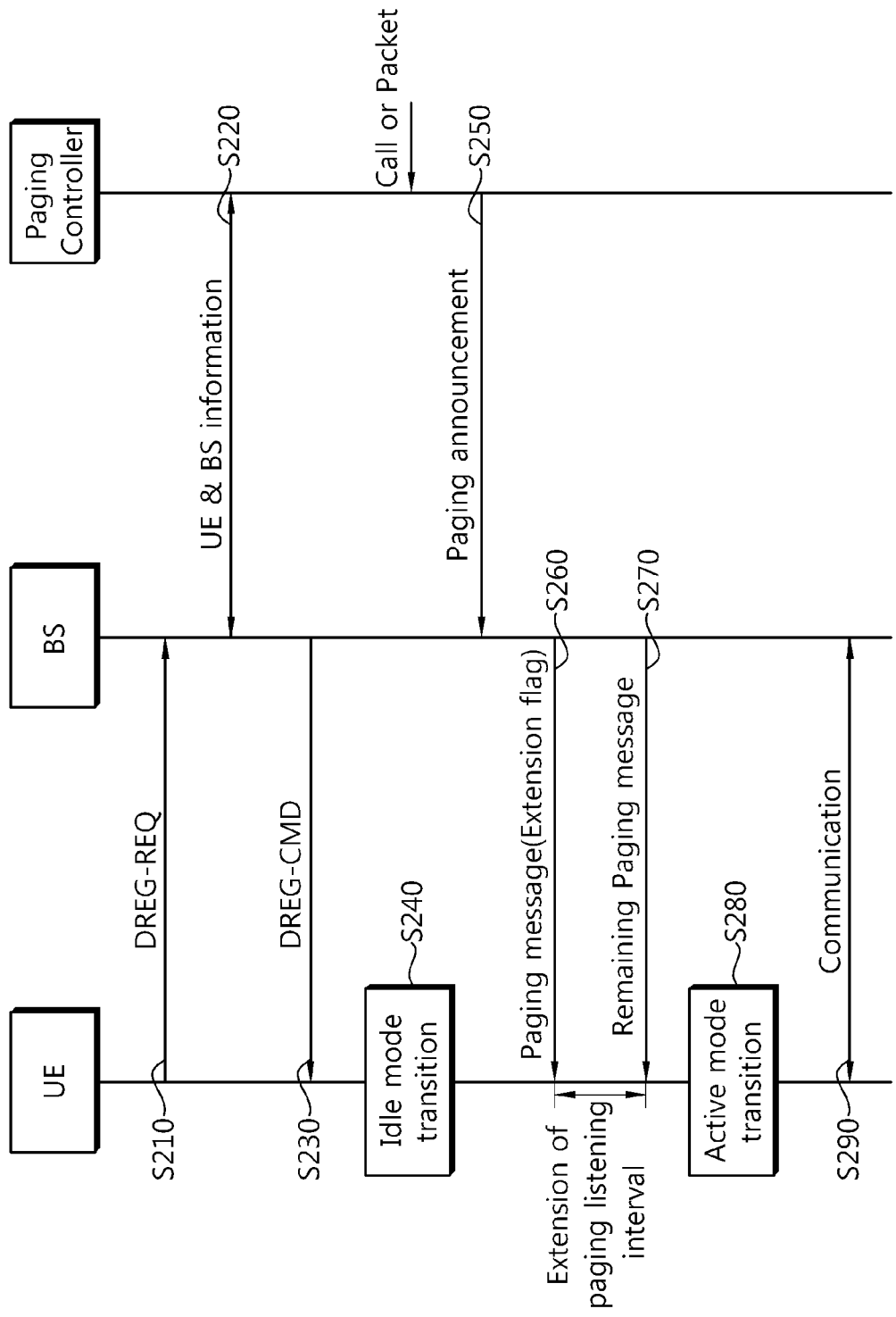
FIG. 5 shows a method of performing a paging message transmission process according to an embodiment of the present invention.

FIG. 5 shows a method of performing a paging message transmission process according to an embodiment of the present invention.

Referring to FIG. 5, when a UE does not transmit or receive data to and from a BS during a specific time period, the UE transmits a deregister request (DREG-REQ) message to the BS to request a transition to an idle mode (step S210).

Upon receiving the DREG-REQ message, the BS exchanges UE & BS information with a paging controller (step S220). The paging controller manages a paging signal for call or data packet transmission for the UE. The paging controller can manage a plurality of BSs by grouping the BSs in a paging group. The plurality of BSs included in the paging group may use one paging group identifier (ID). The UE & BS information includes UE location update information, a cell ID, a paging group ID, etc.

The BS transmits a deregister command (DREG-CMD) message to the UE (step S230). The DREG-CMD message is a response for the DREG-REQ message. If the DREG-REQ message is not transmitted, the UE may retransmit the DREG-REQ message after a deregister timer expires. The DREG-CMD message may include information on a transmission period of the paging message. The transmission period of the paging message includes at least one of a paging cycle, a paging offset and a paging listening interval. The paging cycle denotes a period in which the paging message is transmitted. The paging offset indicates a time at which the paging message is transmitted in the paging cycle. The paging listening interval denotes a time for monitoring the page message by a UE and the BS transmits the paging message during the paging listening interval. For example, the paging cycle may include a plurality of superframes, the paging offset may be indicated in a subframe unit or in a frame unit, and the paging listening interval may include one superframe or one or more frames or one or more subframes.

After receiving the DREG-CMD message, the UE transitions to the idle mode (step S240). Upon transitioning to the idle mode, the UE monitors the paging message by waking up during the paging listening interval based on the paging transmission period. If there is no paging message for the UE, the UE transitions to a sleep state in which a transmit (Tx) signal of the BS is not received.

If call or data packet transmission occurs for the UE after the UE transitions to the idle mode, the paging controller transmits a paging announcement message to the BS (step S250).

Upon receiving the paging announcement message, the BS transmits the paging message to the UE (step S260). A paging group ID may be included in the paging message. The paging message may be transmitted through a broadcast channel or a DL control channel. The paging message may be transmitted over a pre-defined resource region. The resource region for the paging message may include at least one CRU or DRU. The resource region for the paging message may represent a specific frame or subframe in one paging cycle.

The entire paging message may not be transmitted over the pre-defined resource region. The paging message may include an extension flag to indicate extension or non-extension of a resource region for transmission of the remaining part of the paging message or to indicate extension or non-extension of the paging listening interval of the UE. The extension flag may be transmitted independently from the paging message by using another control signal or another control channel. The extension flag may be 1 bit and indicate extension or non-extension of the paging listening interval. For example, if a bit value of the extension flag is set to 1, it may indicate that the paging listening interval is extended, and if the bit value of the extension flag is set to 0, it may indicate that the paging listening interval is not extended.

Table 1 shows an example of the extension flag included in the paging message. Although it is assumed herein that the extension flag has 1 bit, the present invention is not limited thereto.

TABLE 1

| Syntax | Size (bit) | Notes |
| --- | --- | --- |
| MOB_PAG-ADV_message_format( ){ | — | — |
| ~ | | |
| Extension flag | 1 | 0: does not extend pre-defined subframe or frame or superframe to transmit a paging message 1: extend pre-defined subframe or frame or superframe to transmit a paging message |
| ~ | | |
| }//End of MOB_PAG-ADV | | |

It is shown herein that extension is not achieved if a bit value of an extension flag of a predefined subframe or frame or superframe for paging message transmission is set to '0', whereas extension is achieved if the bit value thereof is set to '1'. However, the other way around is also possible, that is, extension may be achieved if the bit value of the extension flag of the pre-defined subframe or frame or superframe for paging message transmission is set to '0', and extension may be not achieved if the bit value is set to '1'.

When the extension flag indicates extension of the paging listening interval, the paging listening interval may be extended by a time pre-defined between the BS and the UE. Upon receiving the paging message including the extension flag, the UE in the idle mode remains in an awake state up to the extended paging listening interval. For example, the paging listening interval may be extended in a subframe unit or a frame unit or a superframe unit. The UE can perform monitoring by extending the paging listening interval up to a subframe next to a subframe in which the paging message is transmitted. Alternatively, the UE may perform monitoring by extending the paging listening interval up to a frame next to a frame in which the paging message is transmitted. Alternatively, the UE may perform monitoring by extending the paging listening interval up to a superframe next to a superframe in which the paging message is transmitted.

If the entire paging message cannot be transmitted in the resource region pre-defined for the paging message, the BS transmits the remaining part of the paging message in a resource region extended within the extended paging listening interval (step S270). For example, the remaining part of paging message may be transmitted over an earliest frame consecutive to a frame in which the paging message including the extension flag is transmitted.

Upon receiving the paging message and/or remaining part of paging message for the UE, the UE transitions to an active mode (step S280). The active mode denotes a normal state of the UE. When in the active mode, the UE can persistently receive a Tx signal of the BS. If the paging message and/or the remaining part of the paging message are not for the UE, in order to reduce power consumption, the UE returns to the sleep state until a next paging cycle arrives. After transitioning to the active mode, the UE communicates with the BS (step S290).

Now, extension of a resource region will be described when a hierarchical frame structure is used for transmission of the remaining part of the paging message. The hierarchical frame structure is assumed to be a time division duplex (TDD) frame structure in which a DL subframe and a UL subframe are divided in a time domain. However, the proposed paging message transmission process can also be applied to a frequency division duplex (FDD) frame structure. The proposed paging message transmission process is not limited to a specific frame structure.

Figure 6:
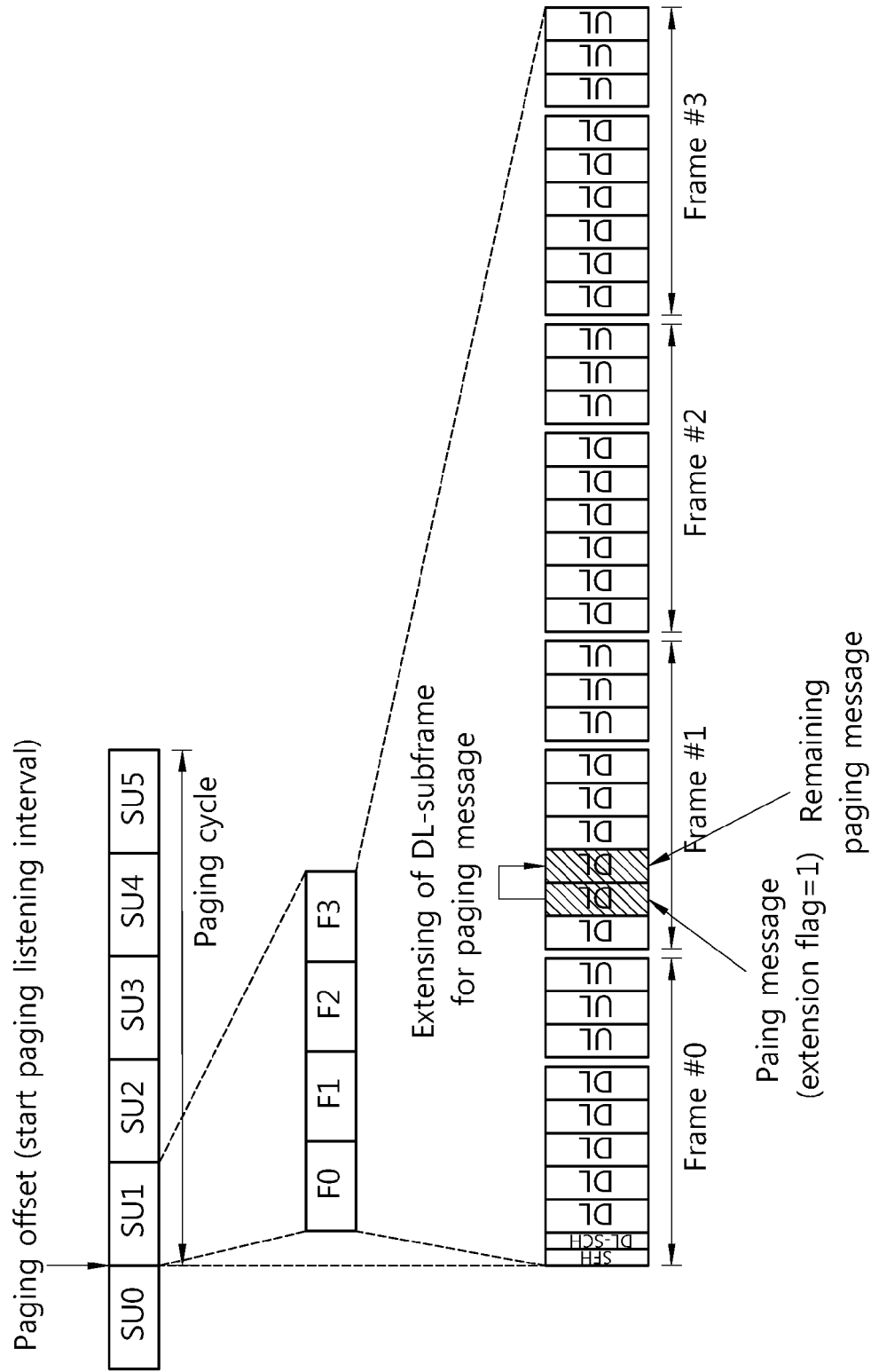
FIG. 6 shows transmission of a paging message in a frame structure according to an embodiment of the present invention.

FIG. 6 shows transmission of a paging message in a frame structure according to an embodiment of the present invention.

Referring to FIG. 6, a paging cycle includes 5 superframes (SUs), and a paging offset indicates a start point of an SU1 (for example, it is assumed that the paging offset can represent one SU from a start point of an SU0). A paging listening interval starts at the start point of the SU1. In addition, it is assumed that the paging listening interval is one SU.

Assume that a 2-nd DL subframe of a frame #1 is pre-defined for paging message transmission. A DL subframe pre-defined for paging message transmission is hereinafter referred to as a paging subframe. A BS transmits the paging message in the paging subframe. An extension flag may be transmitted via the paging subframe.

If the entire paging message cannot be transmitted in the paging subframe, the BS transmits the remaining part of the paging message in an earliest subframe subsequent to the paging subframe (i.e., a 3-rd DL subframe of the frame #1). A DL subframe pre-defined for transmission of the remaining part of the paging message is hereinafter referred to as an extension subframe. A bit value of the extension flag may be set to '1' to indicate extension of a DL subframe unit for paging message transmission. The remaining part of the paging message is transmitted in the extension subframe.

Upon receiving the paging message including the extension flag indicating extension of the DL subframe, the UE in an idle mode may remain in an awake state without entering a sleep state. The extension flag may indicate that a paging listening interval of the UE is extended by a size of the subframe. The UE monitors the extension subframe to receive the remaining part of the paging message. The UE may receive the complete paging message via a paging subframe and an extension subframe, and confirms whether there is a paging message to be delivered to the UE. If the complete paging message confirms that there is no paging message to be delivered to the UE, the UE returns to the sleep state. If there is the paging message to be delivered to the UE, the UE transitions to an active mode for communication.

Figure 7:
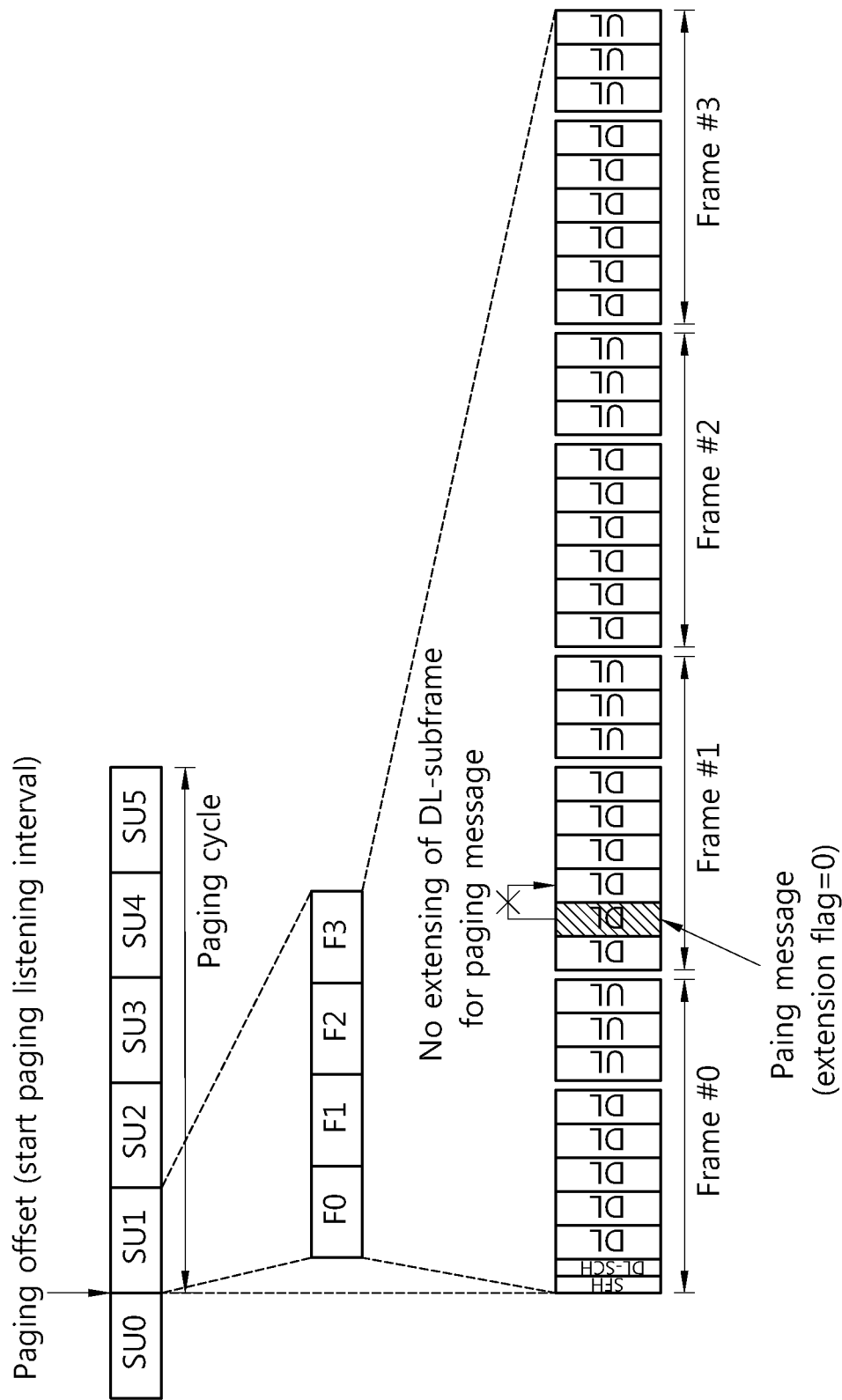
FIG. 7 shows transmission of a paging message in a frame structure according to another embodiment of the present invention.

FIG. 7 shows transmission of a paging message in a frame structure according to another embodiment of the present invention. Comparing with FIG. 6, a bit value of an extension flag may be set to '0' to indicate that there is no extension of a DL subframe for paging message transmission. Entire paging message is transmitted in a paging subframe, and an extension subframe is not assigned. Upon receiving the paging message including the extension flag indicating that there is no assignment of the extension subframe, a UE in an idle mode enters a sleep state, thereby decreasing power consumption.

Figure 8:
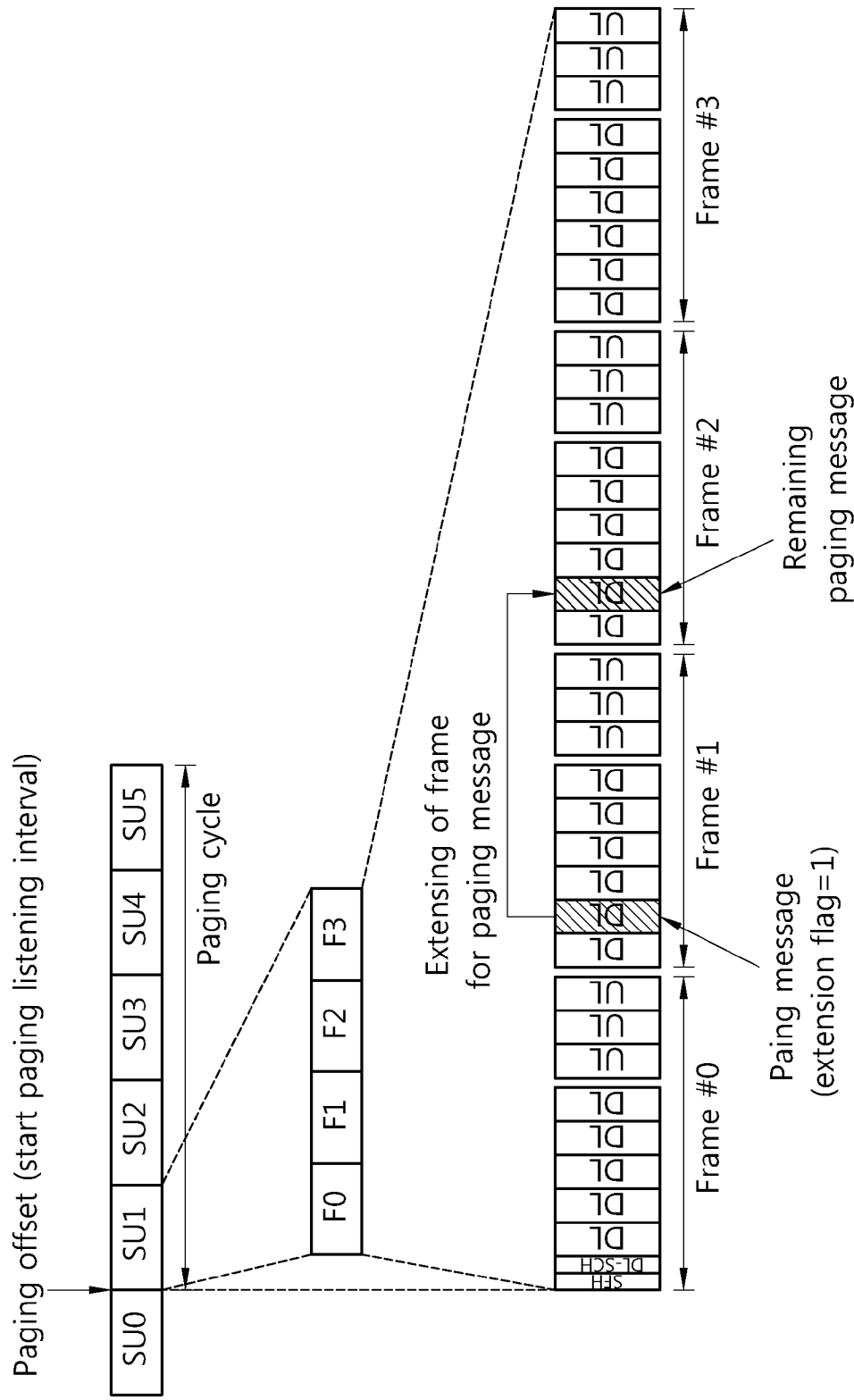
FIG. 8 shows transmission of a paging message in a frame structure according to another embodiment of the present invention.

FIG. 8 shows transmission of a paging message in a frame structure according to another embodiment of the present invention.

Referring to FIG. 8, a paging cycle includes 5 superframes (SUs), a paging offset indicates a start point of an SU1, and a paging listening interval is one SU. In this case, assume that a 2-nd DL subframe of a frame #1 is a paging subframe. The paging message including an extension flag is transmitted in the paging subframe.

If the entire paging message cannot be transmitted over the pre-defined frame #1 including the paging subframe, the remaining part of the paging message is transmitted in a frame #2 which is an earliest frame subsequent to the frame #1. In this case, the extension flag represents extension of a frame unit for paging message transmission (e.g., the extension flag=1). The extended frame (i.e., frame #2) may include an extension subframe for transmission of the remaining part of the paging message. The remaining part of the paging message may be transmitted via the extension subframe.

The extension subframe of the frame #2 may be located in the same position or a different position with respect to a paging subframe of the frame #1.

Upon receiving the paging message including the extension flag indicating extension of the frame unit, a UE in an idle mode may remain in an awake state without transitioning to a sleep state. The extension flag may indicate that a paging listening interval of the UE is extended by a frame size. If the paging message is not fully received in a current frame, the UE confirms the remaining part of the paging message in a next frame. In the next frame, the extension flag may also indicate extension of a frame unit in the remaining part of the paging message. The UE continuously receives the remaining part of the paging message in the next frame. The UE may monitor the extended frame to receive the remaining part of the paging message. If the complete paging message confirms that there is no paging message to be delivered to the UE, the UE returns to the sleep state. If there is the paging message to be delivered to the UE, the UE transitions to an active mode for communication.

Figure 9:
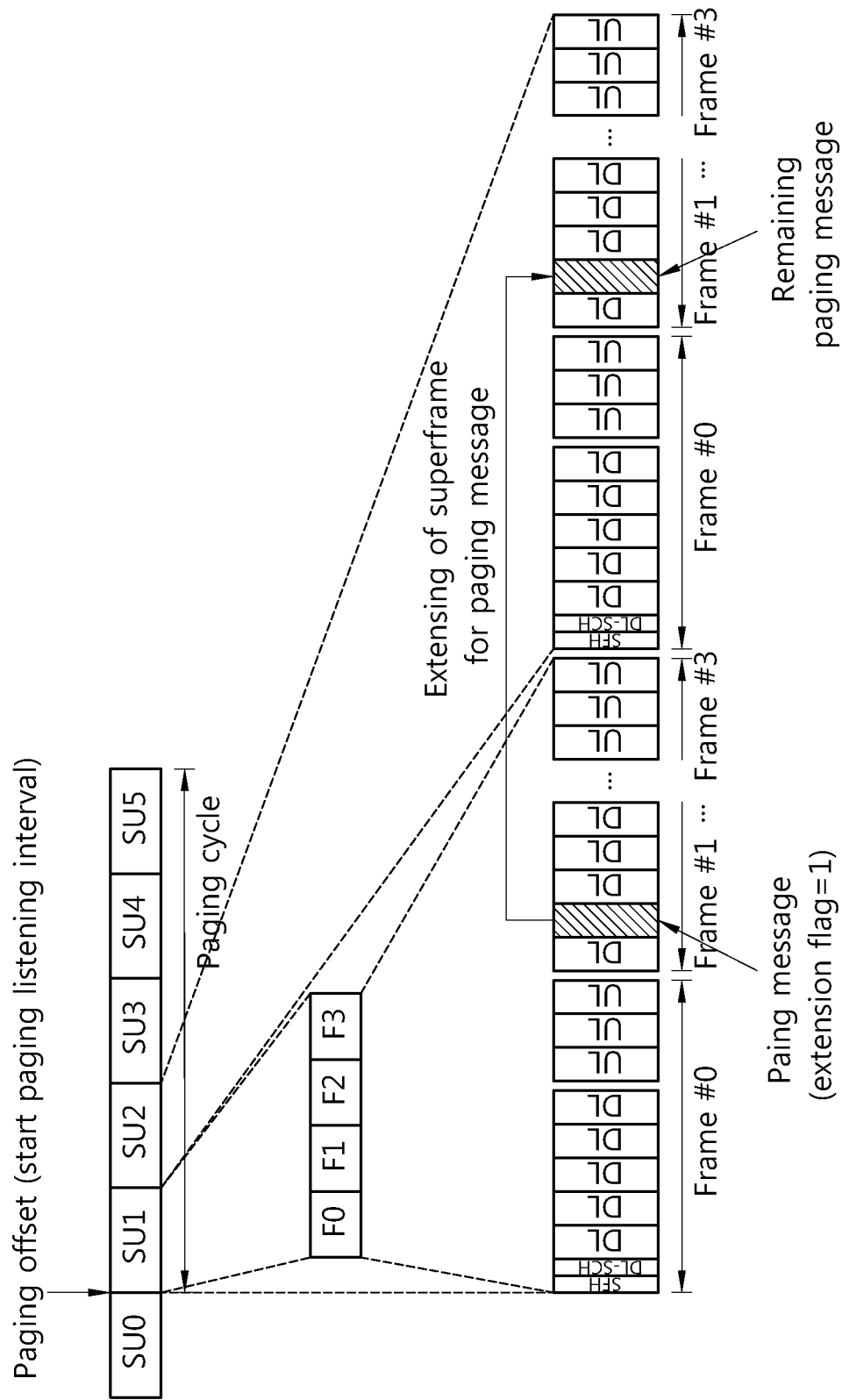
FIG. 9 shows transmission of a paging message in a frame structure according to another embodiment of the present invention.

FIG. 9 shows transmission of a paging message in a frame structure according to another embodiment of the present invention. Comparing with FIG. 8, if the paging message cannot be fully transmitted over a paging subframe, the remaining paging message is transmitted over a superframe SU2 which is an earliest superframe consecutive to a superframe SU1 including the paging subframe. An extension flag indicates extension of a superframe unit for paging message transmission (e.g., the extension flag=1). The extended superframe SU2 may include an extension subframe for transmission of the remaining part of the paging message. The extension subframe may be located in the same position or a different position with respect to a subframe or frame of the paging subframe of the superframe SU1. Alternatively, the remaining part of the paging message may be transmitted over remaining subframes from a first subframe of a frame #2 which is an earliest consecutive frame.

Upon receiving the paging message including the extension flag indicating extension of the superframe unit, a UE in an idle mode may remain in an awake state up to a next superframe without entering a sleep state. The extension flag may indicate that a paging listening interval of the UE is extended by a frame size. The UE monitors the extended superframe to receive the remaining part of the paging message. If the complete paging message confirms that there is no paging message to be delivered to the UE, the UE returns to the sleep state. If there is the paging message to be delivered to the UE, the UE transitions to an active mode for communication.

Although it has been described above in FIGS. 6 to 9 that the 1-bit extension flag is included in the paging message, the extension flag may not always be included in the paging message. Instead, the extension flag may be included in the paging message as an optional parameter. That is, the extension flag may optionally be included or not included in the paging message. Table 2 shows an example of the optional parameter for extension of paging message transmission.

TABLE 2

| Value | Scope |
|---|---|
| extend pre-defined subframe or frame or superframe to transmit a paging message | MOB_PAG-ADV |

If there is no remaining part of the paging message to be transmitted in the aforementioned paging message transmission process and if there is no need to extend a DL subframe or frame or superframe pre-defined for transmission of the remaining part of the paging message, information such as the extension flag may not be included in the paging message. Since the extension flag is optionally included in the paging message, waste of radio resources can be reduced.

Figure 10:
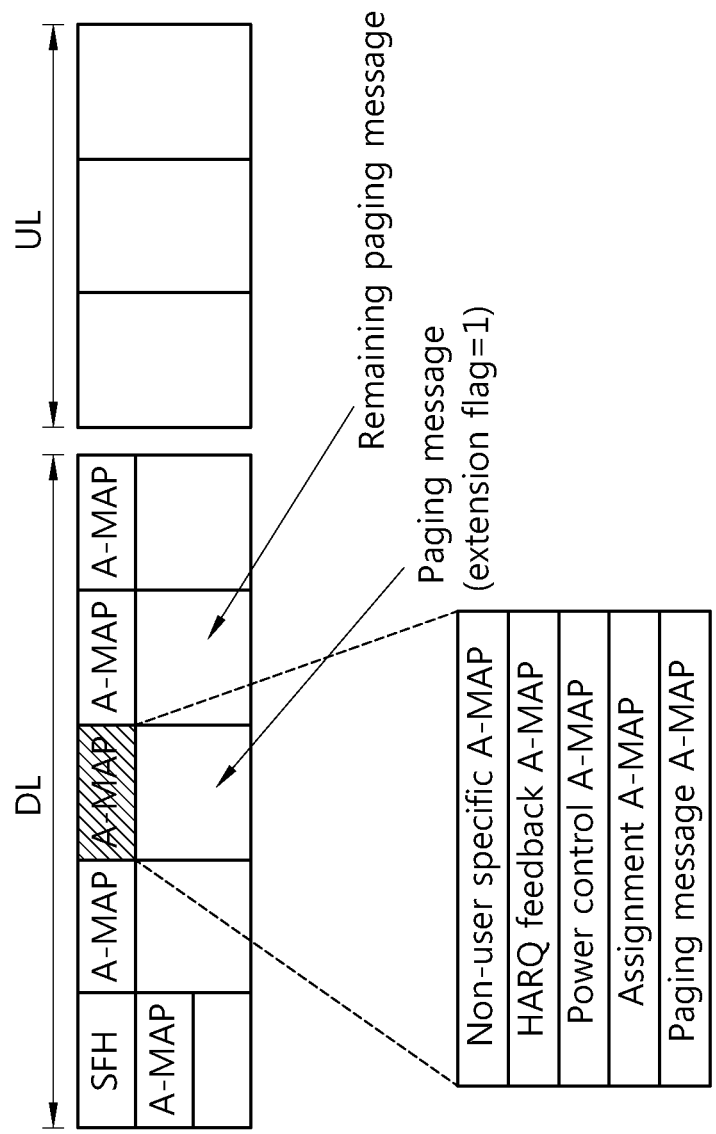
FIG. 10 shows transmission of an extension flag by using MAP information according to an embodiment of the present invention.

FIG. 10 shows transmission of an extension flag by using MAP information according to an embodiment of the present invention. Although a TDD frame structure is assumed for example, the present invention is not limited to a specific frame structure.

Referring to FIG. 10, a TDD frame is divided into a downlink (DL) region and an uplink (UL) region in time domain. In case of an earliest frame in a superframe, a superframe header (SFH) may be located in a first portion of the frame. Broadcast information such as system information is included in the SFH. A plurality of DL subframes may be included in the DL region. Unicast control information may be assigned to the DL subframes. The unicast control information is transmitted using an advanced MAP (A-MAP). An A-MAP region may be assigned to all DL subframes, or may be assigned only to a defined DL subframe.

The A-MAP may include user-specific control information and non-user-specific control information. The user-specific control information may include hybrid auto repeat request (HARQ) feedback information, power control information and assignment information. Accordingly, the A-MAP can be classified into a non-user-specific A-MAP, an HARQ feedback A-MAP, a power control A-MAP, and an assignment A-MAP. The non-user-specific A-MAP carries information for decoding other A-MAPs instead of carrying information on a user-specific or non-user-specific group. The HARQ feedback A-MAP carries ACK/NACK information for UL data transmission. The power control A-MAP carries a power control indication for a UE. The assignment A-MAP carries various types of resource assignment information.

If the paging message cannot be fully transmitted over a pre-defined resource region, a paging message A-MAP may be assigned to the A-MAP region for the purpose of extension of a resource region for transmission of the remaining paging message or extension of a paging listening interval of the UE. The paging message A-MAP indicates information of the paging message. The paging message A-MAP may use any one of a plurality of assignment A-MAPs.

Table 3 shows an example of the paging message A-MAP.

TABLE 3

| Syntax | Size (bit) | Notes |
|---|---|---|
| Resource assignment information | TBD | |
| Extension flag | 1 | 0: does not extend pre-defined DL subframe or frame or superframe to transmit a paging message<br>1: extend pre-defined DL subframe or frame or superframe to transmit a paging message |

The extension flag may be transmitted using the paging message A-MAP. Therefore, the paging message may be transmitted over a data region, and the extension flag may be transmitted over the A-MAP region. The remaining paging message may be transmitted over an earliest consecutive subframe (or frame or superframe). By using the paging message A-MAP, the UE can know that the paging listening interval is extended.

Meanwhile, the paging message may be transmitted by being fragmented into a plurality of messages. When the paging message is fragmented into the plurality of messages, each message is attached with a fragmentation subheader (FSH) in transmission. Table 4 shows an example of the FSH attached to the plurality of messages.

TABLE 4

| Syntax | Size (bit) | Notes |
|---|---|---|
| Fragmentation subheader( ){ | — | — |
| FC | | Indicates the fragmentation state of the payload:<br>00 = No fragmentation<br>01 = Last fragment<br>10 = First fragment |

TABLE 4-continued

| Syntax | Size (bit) | Notes |
|---|---|---|
| | | 11 = Continuing (middle) fragment |
| if (ARQ-enabled Connection) | | |
| BSN | | Sequence number of the first block in the current SDU fragment. |
| else { | | |
| if (Type bit Extended Type) | | |
| FSN | | Sequence number of the current SDU fragment. The FSN value increments by one (modulo 2048) for each fragment, including unfragmented SDUs. |
| Else | | |
| FSN | | Sequence number of the current SDU fragment. The FSN value increments by one (modulo 8) for each fragment, including unfragmented SDUs. |
| } | | |
| Reserved | | |
| }//End of Fragmentation subheader | | |

The UE receives the fragmented paging messages and confirms the SFH. If an FC field value is '11', the UE continuously receives the remaining part of paging message during the paging listening interval.

FIG. 11 shows an operation of a UE in transmission of a paging message according to an embodiment of the present invention.

Referring to FIG. 11, the UE in an idle mode wakes up from a power saving state in which signal transmission/reception is restricted to reduce power consumption at a time indicated by a paging cycle or a paging offset, and then transitions to a listening state capable of receiving the paging message. The power saving state is the aforementioned sleep state. The listening state is the awake state. In general, the UE operates in the power saving state during a paging unavailable interval in which the UE is not paged.

For example, in a frame (or superframe) indicated by the paging offset, the UE transitions to the listening state and receives the paging message. If the received paging message includes an extension flag as in a paging cycle #0, the UE performs monitoring while remaining in the listening state up to a next consecutive frame. If the UE fails to receive all of the remaining parts of the paging message in the consecutive frame, the UE continuously monitors consecutive frames. If the paging message is not fully received during the paging listening interval, the UE remains in the listening state by extending the paging listening interval and monitors the consecutive frames. If the paging message fully received by the UE is not a paging message to be delivered to the UE, the UE returns to the power saving state. If the received paging message does not include the extension flag and no remaining paging message is transmitted as in a paging cycle #1, the UE remains in the listening state during the paging listening interval, and returns to the power saving state at the end of the paging listening interval. If the full paging message is the paging message for the UE, the UE transitions to the active mode for communication.

It has been described that extension or non-extension of the paging listening interval is determined according to whether the extension flag is included under the assumption that the extension flag may not always be included in the paging message. However, as described above, the extension flag may always be included in the paging message, and extension or non-extension of the paging listening interval may be determined according to a bit value of the extension flag.

According to the present invention, an extension flag indicating extension or non-extension of a paging listening interval is used to extend a pre-defined resource region for transmission of a paging message, and transmission delay of the paging message can be reduced. Therefore, a UE can promptly find its paging message, and can promptly transition to an active mode.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of monitoring a paging message in a wireless communication system, the method performed by a mobile station operating in an idle mode comprising a paging listening interval and a paging unavailable interval, the method comprising:
    receiving a segment of the paging message comprising a plurality of segments during the paging listening interval, the received segment of the paging message comprising an extension flag indicating whether a remaining segment of the paging message exists;
    monitoring at least one subsequent subframe or frame to receive the remaining segment of the paging message while the mobile station remains awake if the extension flag indicates that the remaining segment of the paging message exists; and
    entering the paging unavailable interval if the mobile station is not paged after receiving all segments of the paging message.

2. The method of claim 1, further comprising:
    determining whether the mobile station has been paged based on one of the plurality of segments of the paging message.

3. The method of claim 1, further comprising:
    not monitoring the at least one subsequent subframe or frame if the extension flag indicates that the remaining segment of the paging message does not exist.

4. The method of claim 1, wherein the plurality of segments of the paging message are transmitted in different subframes of a predetermined frame.

5. The method of claim 1, further comprising:
    transmitting a request message requesting initiation of the idle mode; and
    receiving a response message in response to the request message.

6. The method of claim 5, wherein the response message comprises information on a paging cycle and a paging offset, and wherein the paging offset is used to indicate a start point of the paging listening interval within the paging cycle.

7. The method of claim 6, wherein the paging cycle comprises the paging listening interval and the paging unavailable interval.

8. The method of claim 7, wherein a length of the paging listening interval is one superframe per paging cycle.

9. A mobile station monitoring, in an idle mode, a paging message in a wireless communication system, the idle mode comprising a paging listening interval and a paging unavailable interval, the mobile station comprising:
    a radio frequency (RF) unit configured to transmit and receive a radio signal; and
    a processor operatively coupled with the RF unit and configured to:
        receive a segment of the paging message comprising a plurality of segments during the paging listening interval, the received segment of the paging message comprising an extension flag indicating whether a remaining segment of the paging message exists;
        monitor at least one subsequent subframe or frame to receive the remaining segment of the paging message while the mobile station remains awake if the extension flag indicates that the remaining segment of the paging message exists; and
        enter the paging unavailable interval if the mobile station is not paged after receiving all segments of the paging message.

10. The mobile station of claim 9, wherein the processor is further configured to:
    determine whether the mobile station has been paged based on one of the plurality of segments of the paging message.

11. The mobile station of claim 9, wherein the processor is further configured to:
    not monitor the at least one subsequent subframe or frame if the extension flag indicates that the remaining segment of the paging message does not exist.

12. The mobile station of claim 9, wherein the plurality of segments of the paging message are transmitted in different subframes of a predetermined frame.

13. A base station transmitting a paging message in a wireless communication system, the base station comprising:
    a radio frequency (RF) unit configured to transmit and receive a radio signal; and
    a processor operatively coupled with the RF unit and configured to:
        instruct the RF unit to transmit a segment of the paging message comprising a plurality of segments to a mobile station operating in an idle mode during a paging listening interval, the idle mode comprising the paging listening interval and a paging unavailable interval, the segment of the paging message comprising an extension flag indicating whether a remaining segment of the paging message exists; and
        instruct the RF unit to transmit the remaining segment of the paging message at at least one subsequent subframe or frame,
    wherein the mobile station remains awake if the extension flag indicates that the remaining segment of the paging message exists, and
    wherein the mobile station enters the paging unavailable interval if the mobile station is not paged after receiving all segments of the paging message.

* * * * *